Aug. 26, 1941.  D. R. HILLIS  2,253,785
FLUID DISTRIBUTING SYSTEM
Filed Dec. 19, 1936   3 Sheets-Sheet 1
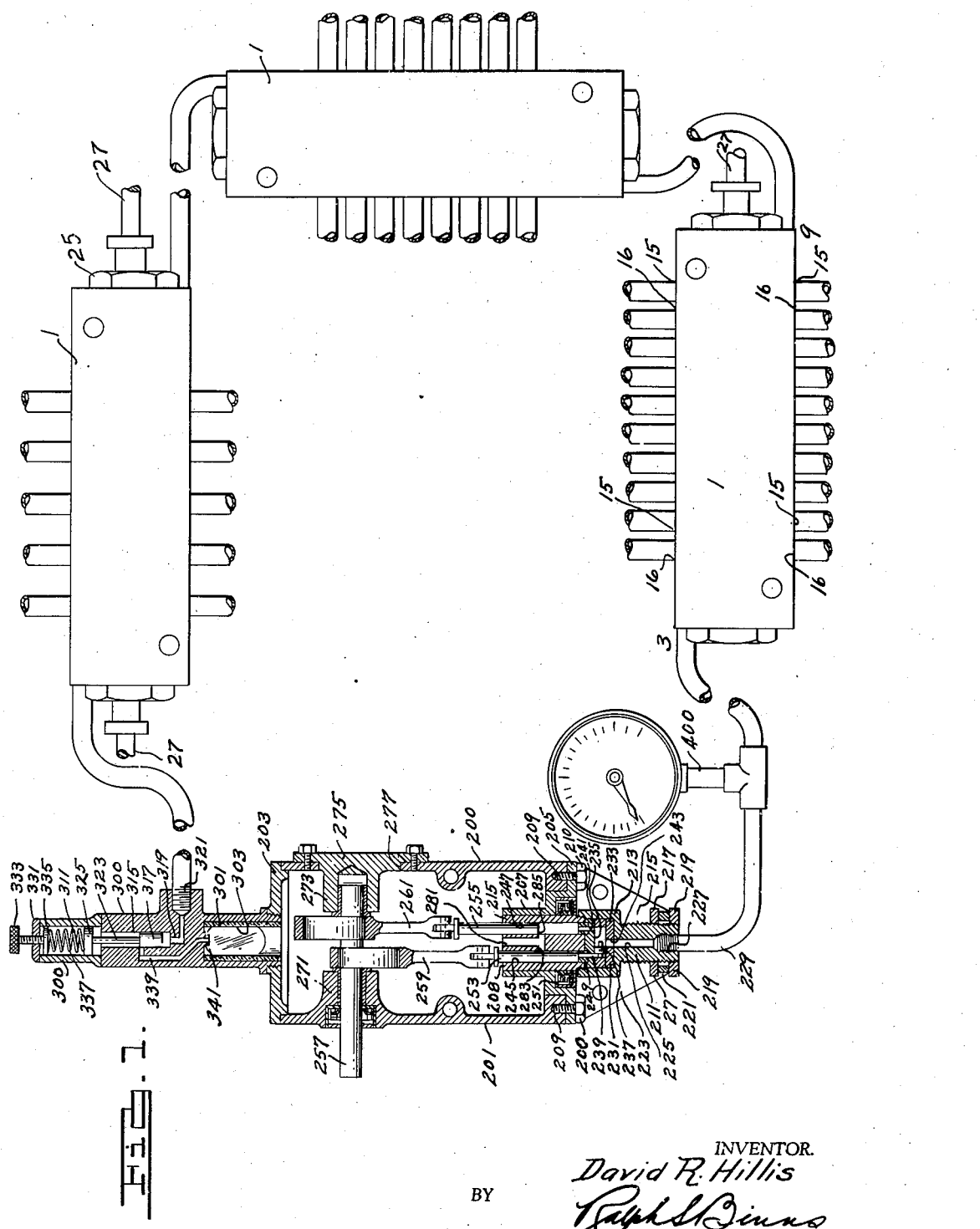
INVENTOR.
David R. Hillis
BY Ralph L. Binns
ATTORNEY.

Aug. 26, 1941.      D. R. HILLIS      2,253,785
FLUID DISTRIBUTING SYSTEM
Filed Dec. 19, 1936      3 Sheets-Sheet 2
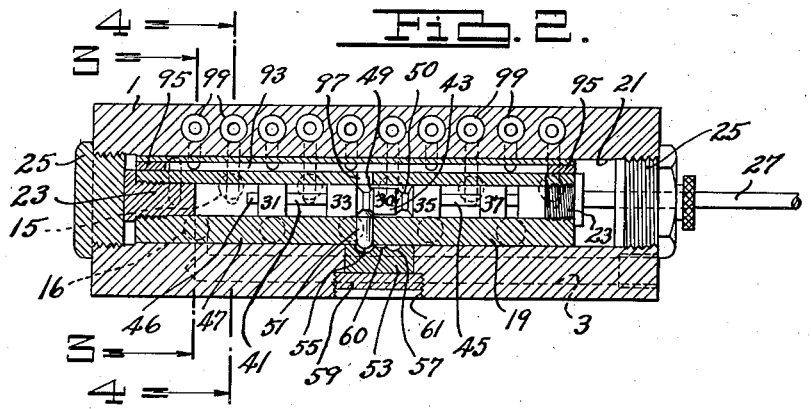
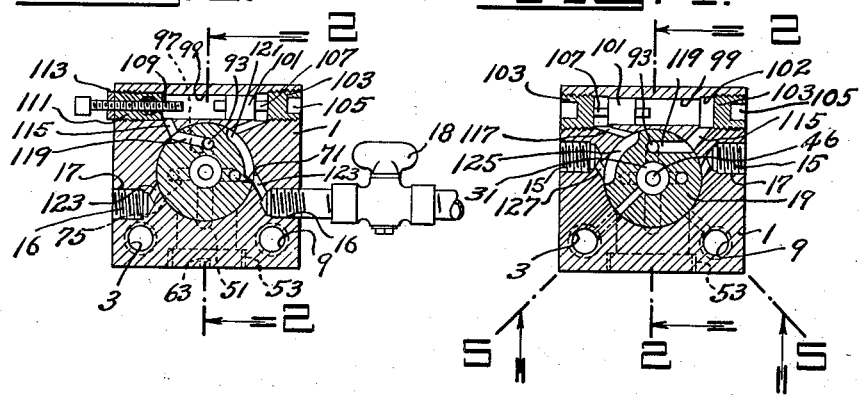
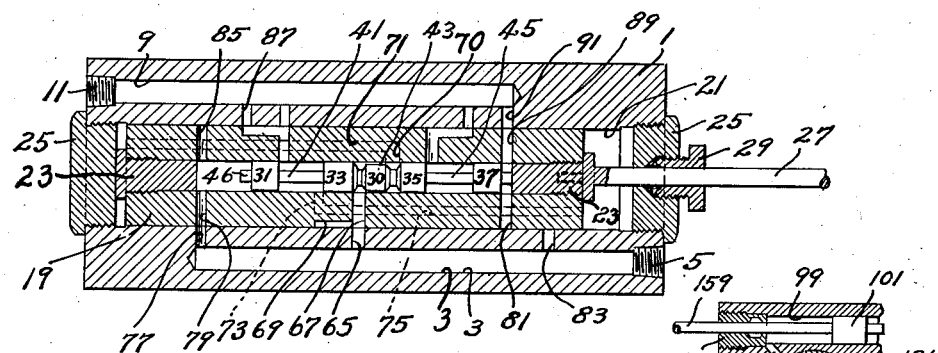
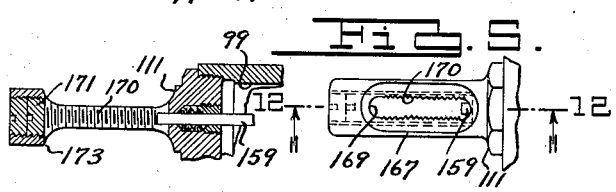
INVENTOR.
David R. Hillis
BY Ralph S. Binns
ATTORNEY.

Aug. 26, 1941. D. R. HILLIS 2,253,785
FLUID DISTRIBUTING SYSTEM
Filed Dec. 19, 1936 3 Sheets-Sheet 3
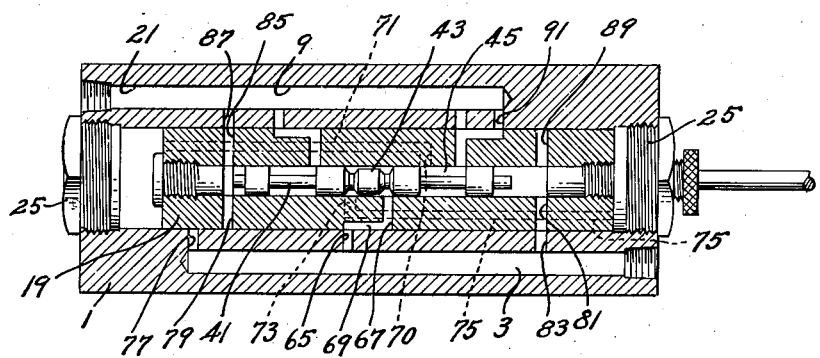
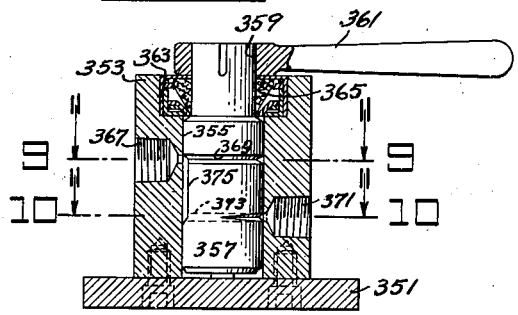
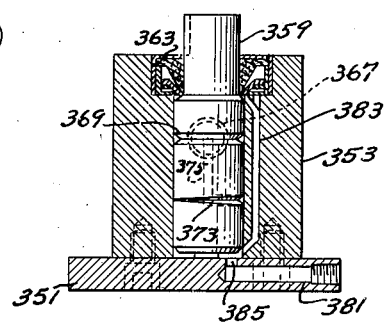
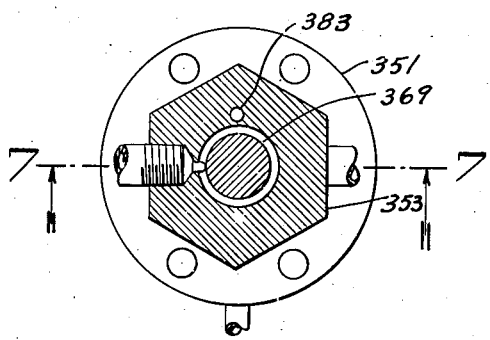
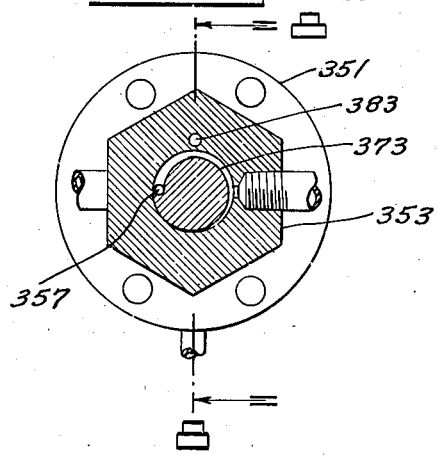
INVENTOR.
David R. Hillis
BY
Ralph S. Burns
ATTORNEY.

Patented Aug. 26, 1941

2,253,785

UNITED STATES PATENT OFFICE 2,253,785

FLUID DISTRIBUTING SYSTEM

David R. Hillis, Detroit, Mich., assignor, by mesne assignments, to Hydraulic Devices, Inc., Detroit, Mich., a corporation of Michigan Application December 19, 1936, Serial No. 116,773

6 Claims. (Cl. 221—102)

The present invention relates to a fluid distributing system and more particularly to a single-line uniflow recirculating fluid distributing system.

Heretofore there have been many attempts to provide a fluid distributing system that will pump fluid under pressure through a single pipe line from a reservoir and back to it in a continuous direction of flow. So far as I am aware, all such attempts have failed on the market because they utilized springs for shifting the dispensing valves or the control valves or valves controlling certain inlet and outlet ports; consequently they were not positive in their operation.

It is therefore the main object of my invention to provide a single-line uniflow recirculating fluid distributing system that is operated entirely by hydraulic pressure.

It is an object of my invention to provide a system for distributing fluid which is extremely adjustable in order to accommodate itself to almost all conditions prevailing at the points requiring fluid to be dispensed.

It is another object of my invention to provide a single-line circuit system that dispenses some of the fluid which is circulated from a reservoir by a pump, the fluid passing through an adjustable volume control device which may be provided in the pump or which may comprise a separate valve, thence passing through a pressure gauge, thence through a pipe line and connecting feeders and thence through a flow impedance and visual flow indicating means and back to the pump reservoir in one continuous direction of flow; thus the volume discharged from the pump may be controlled and a substantially constant or consistent pressure may be maintained in the pipe line for operating the respective hydraulic operators of the feeders and for maintaining sufficient pressure to operate all of the dispensing valves in the feeders.

It is a further object of my invention to provide a single-line uniflow recirculating system for dispensing fluid, the system being provided with fluid-dispensing feeders each of which has one or more fluid-dispensing valves, and, in which system each of said dispensing valves is adapted to dispense fluid under pressure alternately from one of two associated outlet ports.

It is a further object of my invention to provide a system in which the feeders may be made to operate either successively or otherwise, for instance, one at a point further away from the pump may be made to operate prior to one nearer to the pump, and in which system the loss of volume or the loss of velocity of fluid flow in the line, due to some of the fluid being dispensed from other feeders in the line, may be compensated for so that it will not affect the frequency of discharge of fluid from the dispensing valves of other feeders in the line.

It is another object of my invention to provide a novel pump which is particularly adapted for use in the present system.

On the market today, there are two well-known hydraulically operated systems for distributing fluid, known as the dual-line system and the single-line reversible system respectively. In both of these systems it is necessary to have a reversing valve, which to date has been found to be quite expensive to manufacture and quite costly to operate and maintain due to replacements made necessary by wear and tear on the moving parts. Neither of these systems have been developed to a point to give the various adjustments and advantages of my present system.

The main features of my present system are as follows:

1. It is a positive, hydraulically operated, one-way fluid recirculating and distributing system.

2. It is adapted for automatic operation without the use of expensive flow-reversing valves.

3. The pump used in my system has a very simple and practical way of adjusting the volume of fluid pumped therefrom.

4. An additional volume control valve is provided for use in my system where any type of non-positive operating pump is used.

5. The volume of fluid being pumped through the line to the respective feeders in my system normally determines the frequency of operation of the hydraulic operators of the respective feeders and consequently normally determines the frequency of operation of the dispensing valves.

6. Means is provided for insuring operation of the dispensing valves where resistance at the outlet points is to be overcome, said means consisting of an adjustable flow-impedance member which may be adjusted to cause pressure to be developed in the line to any amount that may reasonably be required to overcome the resistance at the outlets from the dispensing valves.

7. Constant indication of flow of fluid returning from the pipe-line is provided and each such visual indication of flow of fluid indicates that one or more of the hydraulic operators of the respective feeders has moved.

8. Individual adjustment for controlling the frequency of operation of the hydraulic operator of each feeder and consequently controlling the frequency of operation of the dispensing valves may be provided for at each feeder, if desired, and such means may also be used for individual indications of the movement of the hydraulic operator valve of each feeder, and individual indication of each dispensing valve may be provided for, either projecting from the valve itself or it may be located at each point where fluid is to be distributed, if desired.

9. The system will handle practically any type of fluid, but is especially adapted for the handling of either grease or oil.

10. It is possible to service one group of receptacles on one sector and to shut off the dispensing port outlets in another or other sectors where their use is not desirable.

11. The feeders used in this system are compact and inexpensive to manufacture and they may be made with a wide variation of the number of outlets from one feeder.

12. Each measuring valve may be provided with adjustable means to control the quantity of fluid dispensed by it, wherever this is required.

The invention itself, however, both as to its construction and its method of operation, together with additional objects and advantages thereof will best be understood from the following description of a specific embodiment thereof when read in conjunction with the accompanying drawings wherein like reference characters designate similar parts throughout, and in which:

Fig. 1 is a schematic general view of my new and improved fluid distributing system, showing some of the parts in section;

Fig. 2 is a longitudinal sectional view of one of the feeders taken on line 2—2 of Figs. 3 and 4;

Figs. 3 and 4 are cross sectional views taken respectively on lines 3—3 and 4—4 of Fig. 2;

Fig. 5 is a longitudinal sectional view taken on two planes at right angles as indicated by line 5—5 on Fig. 4;

Fig. 6 is a similar view showing the positions of the operating elements in a different phase of the operating cycle;

Fig. 7 is a sectional view in elevation taken on line 7—7 of Fig. 9 showing my volume control valve;

Fig. 8 is a sectional view of the same taken on line 8—8 of Fig. 10;

Fig. 9 is a sectional view taken on line 9—9 of Fig. 7;

Fig. 10 is a sectional view taken on line 10—10 of Fig. 7;

Fig. 11 is a detail sectional view of one of my dispensing valves provided with one form of indicator;

Fig. 12 is an enlarged sectional view of one of my dispensing valves provided with a combined indicator and adjustable quantity control means, taken on the line 12—12 of Fig. 13, and Fig. 13 is an enlarged plan view of the means shown in Fig. 12.

Referring more specifically to the schematic illustration of my invention, as shown in Fig. 1, this embodiment of my uniflow recirculating distributing system comprises a pump which pump is provided with adjustable means for controlling the volume of fluid pumped therefrom; the fluid next passes through a pressure gauge and is then passed on through the pipe-line to the respective feeders, passing through the same and returning through the pipe-line to an adjustable flow-impedance member having a visible flow indicator through which it passes into the pump reservoir.

It is obvious that any type of pump may be used with this system by connecting it to a volume control valve such as I have disclosed, but the pump disclosed is particularly well suited, since the effective stroke of the pistons may be readily and easily adjusted to control the volume of fluid discharged. The volume control valve is merely a substitute for controlling the volume of fluid discharged from non-positive types of pumps.

Also where the frequency with which the feeders are to be operated is of small importance and where but little pressure is required at the points of discharge from the dispensing pistons of the feeders, the volume control valve and the pressure gauge and the indicators on the hydraulic-operators of the feeders as well as the flow-impedance member may be omitted, or one or more of them may be omitted as desired.

The pump illustrated is designated generally by the numeral 200 and comprises a member 201 of rectangular or square cross section having a closure member or cap 203 which is removably mounted in any suitable manner to permit filling of the reservoir. The reservoir comprises the cylindrical member and its said cap together with closure means at its lower end.

The member 201 is substantially closed by a base plate 205 having an inturned and upwardly projecting collar 207 in which is mounted the piston cylinder block 208 of the pumping mechanism. The base plate 205 is secured to an inturned flange or bearing member 209 on the base of the member 201 in any suitable manner such as by the bolts 210.

The piston cylinder block 208 is adjustably mounted in the collar 207 and in order to permit the adjustment to be made, the said block is preferably provided with a portion adapted to project beneath the collar 207 at all times. This projecting portion is secured to a lower member 211, constituting the outlet portion of the pump, by any suitable means such as the external screw threads on the block 208 and the internal threads on the top of the member 211. The top portion of said member 211 preferably is externally formed as a hexed nut 213 and the lower or shank portion of said member is reduced and provided with an external thread as shown at 215. Adjustably mounted on this threaded portion 215 of said member 211, are two internally threaded and externally knurled nuts 217 and 219 between which are clamped the arms of a forked member 221, extending from a plate 223 which is fixedly mounted and secured to the pump cylinder in any suitable manner. Thus the turning of these nuts in a manner to normally cause them to move upwardly on the threaded shank 215, causes the shank to be lowered, drawing with it the associated piston block 208. The reverse motion is obvious.

The outlet member 211 is pierced or bored to provide an outlet passage 225 and the lower end of said outlet member, preferably concentric with said passage, is counterbored and internally screw threaded as shown at 227 to receive one end of a pipe-line 229, while the upper end of said outlet member, preferably concentric with said passage, is counterbored to receive a valve member designated generally by the number 231.

The valve member 231 comprises a valve body 233, transversely bored to form a cylinder, as shown at 235, to accommodate a small reciprocatable piston 237, the said bore being suitably plugged at its ends. At the upper portion of each end of the said cylinder, it is provided with an inlet port, said ports being designated by the numerals 239 and 241 respectively. In the mid portion of the said cylinder there is provided a valve outlet port 243 registering with the pump outlet passage 225.

The pump piston block 208 is provided with two spaced cylindrical bores 245 and 247 bored through from top to bottom, and said bores register with the respective valve inlet ports 239 and 241. Said valve inlet ports are preferably counterbored as shown to accommodate pierced locating members 249 which are mounted in the base of the piston bores 245 and 247 and project into said counterbores of the valve inlet ports.

Suitable packing means are provided to prevent escape of fluid between the pump piston block and the inturned collar 207 of base plate 205 as shown by the numeral 251.

Mounted to reciprocate in the respective bores 241 and 247 of the pump piston block 208, are pistons 253 and 255, which are connected to a drive shaft 257 suitably mounted in the pump reservoir, by connecting rods 259 and 261 respectively, the said connecting rods being concentrically mounted on the shaft 257 in such manner that one piston makes a power stroke while the other makes a suction stroke.

For convenience in mounting the said drive shaft 257, I prefer to cast the portion 201 of the pump with an internally projecting bearing 271 and to cast a similar bearing 273 in a plate member 275 fitting into and closing an opening 277 in the side wall of the cylinder, the said plate being flanged and bolted to said cylinder wall.

Between the two piston bores 245 and 247, the piston block is further provided with a central bore 281 which penetrates to a point below to accommodate the pistons in all positions of adjustment, and at that point the passage opens into each of the cylindrical bores as shown by the branch passages 283 and 285.

From the foregoing description, it will be seen that as the pump shaft 257 is rotated, the pistons 253 and 255 make alternate strokes in their bores 245 and 247 so that when they are occupying the positions shown in Fig. 1 the piston 253 has just commenced its suction stroke and the piston 255 has just commenced its power stroke, fluid having been sucked from the reservoir through the central passage 281 and the branch passage 285 of the pump piston block member 208 into the bore 247 so that the piston 255 is now pumping fluid ahead of it through the valve inlet port 245 into the valve chamber 235 causing the piston 237 to move to the left as shown for opening the valve outlet port 243 whereby the fluid is discharged into the outlet passage 225 and through the outlet port 227 into the pipe line 229. The piston 253 in making its suction stroke creates a vacuum in the bore 245 so that as the piston raises beyond the passage 283 fluid will be sucked into said bore 245 from whence it will be discharged through the valve inlet port 239 causing the piston 237 to move to the right and permitting the escape of the fluid under pressure to the outlet port of the pump.

Referring now to the flow-impedance member with its visual indicator, all of which is shown mounted on the cap 203 of the pump, the same comprises a body member 300 provided with a large cylindrical bore 301 in the base thereof projecting upwardly to a substantial degree, and in which is mounted in any suitable manner, a transparent member 303, such as glass, through which the flow of fluid may be visually discerned. The member 300 is secured to an opening in the cap 203 in any suitable manner, such as by means of the bearing members, flanges and screw thread portions shown. The top portion of the body member 300 is provided with a cylindrical bore 311 for a substantial distance and thereafter a smaller bore concentric therewith is pierced down a substantial distance to form a cylindrical wall 315 for a reciprocating valve piston 317 which is mounted therein. At the base of said cylindrical passage 315, a return passage 319 connects to the pipe-line return port 321.

The piston valve 317 is provided with a stem 323 of reduced diameter and with a cylindrical guide head 325, the latter being mounted in the enlarged bore 311. A cap 331 to close the top of the member 300 is suitably secured thereover in any suitable manner. This cap is pierced to accommodate an adjustable screw member 333 having an elongated stem adapted to press upon a disk 335 which is also mounted in the bore 311. Between said disk and said piston head 325 is a strong compression spring 337. The piston bore 315 is provided with a passage 339 leading from a point substantially midway thereof and said passage terminates in a nozzle 341 discharging into the enlarged bore 301 from whence fluid may pass into the pump reservoir.

The action of this member is as follows: Fluid returning from the pipe line under pressure enters the member 300 through the port 321 passing up the passage 319 into the bore 315 forcing the piston 317 to rise, thus compressing the spring 337 to such an extent as to permit the lower portion of the piston 317 to rise above the opening of passage 339 whence fluid can pass through said passage 339 and back to the pump reservoir and its flow may be seen through the transparent member 303.

As shown in Fig. 1, connected to the pipe-line 229 is a standard pressure gauge 400 from which fluid passes to a continuation of the pipe-line and thence through the respective feeders and back to the reservoir, as previously described.

In case a geared pump or any non-positive operating pump is used, the pipe-line may be connected to a volume control valve, such as shown in Figs. 7-10 of the drawings, from which fluid will then pass to the continuation of the pipe-line leading through the rest of the system.

The volume control valve includes a base member 351 upon which is mounted a valve body member 353 secured thereto in any suitable manner. The body member is longitudinally bored from top to bottom as shown at 355 to receive a cylindrical valve member 357 which is adapted to be manually turned for adjustment therein. The upper portion of the cylindrical valve member 357 is reduced in diameter, as shown at 359, and projects above the upper portion of the member 353 to receive a handle member 361 which is secured thereto in any suitable manner.

The upper portion of the body member 353 is counterbored as shown at 363 and provided with suitable packing means 365 to prevent fluid from leaking out between the top of the cylindrical valve member 357 and the top of the valve cylinder. Said packing means surrounds the reduced portion 359 of the valve member 357 between its enlarged portion and the handle.

The valve body member is provided with an inlet port 367 and opposite the central portion of said port, the valve member 357 is provided with an annular groove 369. The valve body 353 is also provided with an outlet port 371 to the pipe-line and opposite the central portion of said port, the valve 357 is provided with a groove 373 leading substantially three-fourths of the way around said cylindrical valve 357, the groove varying in depth and in width gradually from one side thereof to the other, tapering out to a fine line. At a point connecting the largest portion of the groove 373, the valve portion 357 is also provided with a groove 375, connecting to the groove 369, whereby fluid may pass through the inlet port 367 into the groove 369 down through the groove 375, into the groove 373 and thence out through the port 371 to the continuation of the pipe line.

For entrapping any of the fluid that might tend to leak out of said valve, I provide an additional outlet port 381 which may connect by a pipe line to any suitable receptacle or back to the pump reservoir and in the valve body 353, I also provide a passage 383 leading from the base of the reduced portion 359 of the valve member 357 down to the base of the valve member 357 and I provide a port 385 connecting said passage 383 to the said outlet port 381.

It will be seen that by turning the handle 361, the valve portion 357 may be adjusted to control the volume of fluid passing to the valve outlet port 371.

Referring more specifically to Figs. 2–6, I have shown one embodiment of my hydraulically operated fluid dispensing feeder, the same having been disclosed in detail in my patent application, Serial No. 114,323, filed December 5, 1936. The feeder illustrated is provided with twenty outlet ports connected to associated pipe lines as shown in Fig. 1, which may lead to fluid receptacles or bearings. The feeder, comprising an automatic uniflow operated device, consists of a metallic body or casing 1 for housing the movable elements therein. For receiving fluid under pressure from the pump and pipe line of the system, I provide an inlet port 3 comprising a passage drilled longitudinally therein from one end. The inlet port 3 is provided with internal threads 5 adjacent its outer end for convenient connection with a continuation of the pipe line 229.

For discharging the fluid, after it has operated moving parts of the feeder in a manner to be subsequently described, I provide an exhaust port 9 by drilling a passage longitudinally into one end of the casing, preferably from the end opposite from the inlet port to facilitate connecting the device into the pipe line circuit. The outer end of the exhaust port 9 has internal threads 11 for convenient connection with a continuation of the pipe line.

As previously pointed out, the system is provided with suitable flow impedance means for maintaining a high back pressure in the pipe line, say of about 500 pounds per square inch, thus insuring operation of each dispensing valve where the resistance is less than that.

Fluid dispensing ports 15 and 16 are provided, arranged respectively in upper and lower horizontal rows disposed in the two opposite sides of the feeder casing 1 for dispensing fluid therefrom. Ports 15 are shown in cross section in Fig. 4 and ports 16 are shown in Fig. 3. Internal threads 17 are provided in the dispensing ports 15 and 16 to facilitate connection with individual pipes extending separately to the various stations or bearings to be served.

For dispensing the fluid from the ports 15 and 16 automatically in response to unidirectional pressure applied by the fluid in the inlet port 3 of the feeder, I provide a hydraulic-operator comprising a hollow piston 19 which is slidably disposed in a cylindrical aperture or bore 21 extending axially through the casing, and which operates reciprocatably therein. The construction and operation of my hydraulic-operator is also disclosed and described in my co-pending application, Serial Number 113,873, entitled "Hydraulic-operator" and filed December 2, 1936.

The opposite ends of the hollow piston 19 are closed by piston plugs 23 and the cylinder bore 21 by cylinder plugs 25 which are threadably secured therein. To one of the piston plugs 23 an indicator rod 27 is connected, as by threading or welding, and it projects from the casing through the adjacent cylinder plug 25 which is suitably apertured and provided with a packing nut 29 for compressing suitable packing to provide a sliding seal around the rod in a manner that will be readily understood. As the piston 19 reciprocates in the feeder casing 1, the projected indicator rod 27 provides external indications of the continual operation of the device.

Slidably disposed in the hollow piston is a piston valve 30 of the dumb-bell type comprising fluid flow restricting heads 31, 33, 35 and 37 connected by connecting rods 41, 43 and 45 of reduced cross section to permit fluid to flow freely around. Spacing stop pins 46 project from opposite ends of the valve 30. The middle connector 43, which is smaller in diameter than the bore 47 within the piston, is larger than the other connectors in order to provide interlocking grooves 49 and 50 at opposite ends to be interlockingly engaged by a pin 51 which is slidably disposed in a suitable aperture extending through the side wall of the hollow piston 19 near its mid point. The pin 51 is longer than the aperture in which it is slidably disposed. A camming plug 53, which is inserted through a suitable aperture in the side wall of the casing, is provided with interlocking recesses 55 and 57 for engaging the outer end of the interlocking pin 51. The camming plug 53 has an enlarged head 59 which is threaded for accurately seating in an enlarged counter-bore 61 which is internally threaded for receiving the same. A groove 60 is provided in the inner end of the camming plug 53 for receiving the outer end of locking pin 51 and in cooperation with the recesses, prevents rotation of the hollow piston. A tool receiving aperture 63 is provided in the camming plug.

When the camming plug 53 is properly installed, the camming recesses 55 and 57 on its inner end, are spaced apart in an axial direction in the casing 1 and the distance between them is substantially equal to the distance which the hollow piston 19 is free to slide in cylinder bore 21. This distance is determined by the length of the hollow piston 19 and the projected positions of the inner ends of the cylinder plugs 25. During the slidable movements of the hollow piston 19 in the casing, the interlocking pin 51 is depressed by the camming plug 53 to hold the slide valve 30 until the movement of the piston is completed when the slide valve is released, and conversely, when the parts are in position for the slide valve to shift, the cam portions thereof cause the pin to be depressed into either of the camming recesses to prevent movement of the piston 19 simultaneously therewith.

For admitting the high pressure fluid into opposite ends of the cylinder bore 21 to reversely work the hollow piston 19, I provide a passage 65 which leads from the inlet port 3 transversely through the side wall of the bore 21 substantially at the middle of the casing. Near its mid point the side wall of the hollow piston 19 is pierced by a passage 67 and a groove 69 is cut from the outer end axially in the outer surface of the piston whereby a continuous connection is provided to supply fluid pressure in the piston 19 in all positions thereof. The fluid pressure is thus applied around the middle connector 43 of the slide valve in the space in the piston between heads 33 and 35. From the middle of the piston 19, the fluid is passed through a port 70 and an axial passage 71 into the left hand end of the cylinder bore 21 thus shifting the piston 19 to the right, and the slide valve stays in the same relative position to the piston 19, having its head 35 to the right of the port 70. Pressure entering through ports 3, 83 and 81 now shifts slide valve 30 to the left, the ports then being as shown in Fig. 6. The head 33 of the said valve 30 is now at the left of a port 73, and fluid is then passed from the hollow piston through an axial passage 75 into the right hand end of the cylindrical bore 21, as shown in Fig. 6, and the hollow piston 19 is then forced to the left by said fluid pressure.

In order that the reciprocating movement of the hollow piston 19 may continue, as long as fluid pressures are applied in the inlet port 3, it is necessary to move the sliding valve in response to the movements of the piston and this is accomplished by applying fluid pressures alternately into opposite ends of the hollow piston. For this purpose, I provide a passage 77 which connects from the inner end of the inlet port 3 and suitably pierces the side wall of the bore 21 for conductively connecting with a port 79, which pierces the adjacent side wall of the hollow piston, when the piston is at its left position, as in Fig. 5. This tends to push the sliding valve to its right hand position, as shown in Fig. 5. The valve assumes this position immediately after the piston 19 attains its extreme left hand position, and upon its movement the locking pin 51 is depressed into recess 55 in the manner previously described.

When the hollow piston 19 is in its right hand position, as shown in Fig. 6, the port 81, which pierces the side wall thereof, connects conductively with the stationary port 83 which leads into the inlet port 3. This connection applies fluid pressure in the right hand end of the hollow piston for moving the slide valve to the left hand end as viewed in Fig. 6.

In order that the valve may thus continue to slide in alternatively opposite directions in response to fluid pressures applied alternatively to opposite ends thereof, it is necessary to exhaust the fluid charged into the opposite end of the hollow piston 19 by the previous operation. For this purpose an exhaust port 85 is so disposed in the piston side wall adjacent the left end of the piston that it connects with a stationary exhaust port 87 leading into the outlet port 9 in the casing, when the piston is in its right hand position, as in Fig. 6. In the alternative position on the piston 19, as shown in Fig. 5, a port 89 connects with a port 91 leading into the outlet port 9 for exhausting fluid previously charged into the right hand end of the piston.

It will thus be seen that the application of fluid pressure in the inlet port 3 causes pressures to be applied alternatively through the passages 71 or 75 for reversely moving the hollow piston under the control of the slidable valve 30 carried therein, and that the movement of the piston completes fluid conducting connections for successively reversely operating the sliding valve. The operation of the sliding valve 30 and of the piston 19 is further controlled by the locking pin 51 which prevents simultaneous movement thereof.

From the respective rows of dispensing ports 15 and 16, measured quantities of fluid are discharged alternatively and successively by the continued operation of the hydraulic-operator. For this purpose, the side wall of the hollow piston 19 of my hydraulic-operator is drilled to provide a passage 93 extending axially therethrough, and the ends of the passage are closed by metallic plugs 95 threaded or welded therein. From the intermediate portion of the hollow piston 19, into which fluid pressures are continuously applied from the inlet port 3 as previously explained, I provide a transverse passage 97 which connects into the middle of the elongated axial fluid dispensing passage 93 in the piston.

In accordance with my invention, the fluid dispensed from the elongated dispensing passage 93 in the piston to the respective dispensing ports 15 and 16 is measured and this is accomplished in measuring chambers 99. There are half as many dispensing chambers as there are ports 15 and 16. For instance, the feeder shown in Figs. 2-6 is provided with ten measuring chambers 99, and with twenty discharge outlets 15 and 16, half of the outlets being on one side and half on the other side of the feeder as may be seen in plan view in Fig. 1.

Each measuring chamber 99 is a cylindrical bore drilled transversely through the casing 1 to slidably receive a measuring piston 101. The ends of the measuring chambers 99 are provided with counter-bores 102 which are threaded for receiving plugs 103, having wrench receiving apertures 105, as shown in Fig. 4. Spacing pins 107 extend from opposite ends of each measuring piston 101 for abutting the end plugs 103 to stop the pistons in spaced relation therefrom.

For adjusting the degree of movement of the measuring piston 101, an adjustable threaded stop rod 109 is threadably mounted in an adjusting plug 111 which may be conveniently installed in any of the chambers where it is desirable to provide for adjusting the measured quantities of fluid discharged therefrom. A wrench receiving portion 113 of square or hexagonal conformation may be provided for installing or removing the adjusting plug 111.

A conduit passage 115 connects from one end of each measuring chamber 99 and extends toward the axis of the cylinder bore 21 for intersection with the side wall thereof. From the opposite end of each measuring chamber, a passage 117 extends to similarly intersect the walls of the cylinder bore 21, but at a smaller angle from the chamber 99. The respective opposing passages 115 and 117 of each measuring chamber 99 thus connect into the cylindrical bore 21 from alternately opposed sides of each succeeding chamber 99, that is to say passage 115, which is directed toward the axis of the bore from one side of the first measuring chamber, is connected from the opposite end of the next measuring chamber, and so on as may be seen in Figs. 2, 3 and 4. Throughout the length of the casing 1, the measuring chambers 99 are thus provided with the end connecting passages 115 and 117 disposed on alternatively opposite sides of the casing.

Wherever it is desired to have indication of the operation of any individual dispensing valve, an indicator rod 159 may be provided on the dispensing pistons 101 passing through the plugs 103 which may be suitably apertured and packed as shown in Fig. 11. When it is desired to have the indicator also control the amount of fluid to be discharged, the adjustable stop rod 109 may be omitted, and capacity of the dispensing feeder may be regulated by the structure shown in Figs. 12 and 13, wherein an indicator rod protecting sheath 167 of tubular conformation is provided, projecting outwardly from the cylinder plug through which the indicator rod projects, and the sheath is provided with open side wall portions 169 through which the indicator rod 159 may be observed.

The tubular sheath 167 is provided with threads 170 to receive an adjustable stop plug 171 for engaging the outer end of the indicator rod 159 as it is projected from the dispensing cylinder 99. By adjusting the position of the stop plug 171 in the sheath, the degree of movement of the dispensing piston 101 may be conveniently varied and consequently the quantity of fluid discharged may be varied. A second threaded lock plug 173 is turned into the sheath for locking the stop plug 171.

As the piston 19 slides in the casing it dispenses fluid from the elongated dispensing passage 93 into the ends of the measuring chambers 99 through passages 119 provided in the piston and disposed in alternately opposite directions for connecting with the passages 115. By this arrangement the measuring piston 101 in each measuring chamber is moved in the reverse direction, as compared with the adjacent pistons. As shown in Fig. 3, the measuring piston 101 has completed its movement to the right in the measuring chamber, and in so moving it discharged a predetermined quantity of fluid which had been previously charged in on the opposite side of the piston. The dispensed fluid passed out through an arcuate groove 121, cut in the peripheral outer surface of the right side of the piston for connecting with the inner end of a passage 123, through which the dispensed fluid passed out of the adjacent dispensing port 15.

In the next adjacent measuring chamber, as shown in Fig. 4, the fluid under pressure was passed from the dispensing passage 93 by way of passages 119 and 115 into the right end of the chamber 99 forcing the measuring piston 101 to the far or left end and dispensing the fluid previously charged therein, through the passage 117 around an arcuate groove 125 in the left side of the piston and thence by way of a passage 127 out of the adjacent dispensing port 16. There are a plurality of spaced grooves 121 and 125 which are so arranged on the piston that half the passages 115 connect therewith and half of the passages 117 connect therewith in each position of the piston. As seen in Fig. 2, five of these grooves are located on one side of the piston and six on the other, and opposite each of said grooves in the piston one of the passages 119 is located, so that there are alternately disposed on said piston five grooves and six passages 119 on one side thereof and six grooves and five passages 119 on the other side thereof. This makes a total of eleven openings on each side of the piston so that ten of them per side may register with the passages leading to the ten respective measuring chambers at each end of the piston stroke.

In a given position of the piston 19, each of the pistons 101 shifts, but only one half of the dispensing ports are thus served. When the piston is next moved to its alternative position, by the reciprocating movements automatically induced and maintained by the pressure of the fluid entering the inlet port 3, the other half of the dispensing ports are then served. This is accomplished by the movement of the piston in carrying its dispensing passages 119 to inject fluid into the ends of each measuring chamber from which fluid was discharged by the previous operation. Simultaneously, each arcuate groove 125 and 121 in the piston, except the pair closest to one of the plugs 25, is connected with the adjacent measuring chamber 99 for taking the fluid dispensed therefrom into the adjacent dispensing port which was disconnected in the previous operation.

It will be noted that any suitable means may be provided for varying the amount of fluid displaced upon each stroke of the piston 19. For instance, by substituting an indicator having a larger diameter, or by using an indicator on both ends of the piston 19, less fluid will be received and displaced in the respective ends of the cylindrical bore 21 of the casing and thus the reciprocation of the piston will be speeded up materially.

It will further be noted that any of the outlet ports 15 and 16 may be plugged by suitable plugs or that the branch pipes leading therefrom may be provided with a stop cock 18, as shown in Fig. 3; thus by any such means, the opposite outlet ports of any feeder may be plugged without affecting the operation of any of the other dispensing valves of any feeder.

Aside from the specific embodiments of the invention herein shown and described, it will be understood that numerous details of the construction may be altered or omitted without departing from the spirit and scope of the invention as disclosed and claimed, and that I do not desire to limit the invention to the exact constructions herein set forth.

I claim:

1. A liquid distributing system comprising, a pump, a casing having a single liquid inlet adapted to receive liquid under pressure from said pump, a single exhaust port for exhausting liquid by-passing through said casing, said casing including a liquid dispensing measuring means having a plurality of dispensing ports and means for controlling liquid under pressure to said measuring means and for operating the same, said control means being adapted to continuously receive liquid under pressure from the pump through said casing inlet and to be operated continuously by the pressure of the liquid so received and to continuously by-pass a portion of the liquid out of said single exhaust port, and means for regulating the rate of fluid delivery from said pump.

2. A liquid distributing system comprising, a pump, a pipe-line connected thereto, a liquid dispensing feeder connected to said pipe-line having a single inlet adapted to receive liquid under pressure from said pump and pipe-line, and a single exhaust port for exhausting liquid by-passing through said feeder, said feeder also having a reciprocatable valve adapted to dispense a measured quantity of liquid upon each stroke thereof and to be operated by the pressure of said liquid, said feeder also having means adapted to control liquid under pressure alternately to opposite sides of said reciprocatable valve, said control means being adapted to continuously receive liquid under pressure from the pump through said feeder inlet and to be operated continuously by the pressure of the liquid so received and to continuously by-pass a portion of the liquid out of said single exhaust port, and means for regulating the volume of fluid delivered from said pump.

3. A liquid distributing system comprising, a pump, a casing having a single liquid inlet adapted to receive liquid under pressure from said pump, a single exhaust port for exhausting liquid by-passing through said casing, said casing including a liquid dispensing measuring means having a plurality of dispensing ports and means, including a reciprocatable member, for controlling liquid under pressure to said measuring means and for operating the same, said control means being adapted to continuously receive liquid under pressure from the pump through said casing inlet and to be operated continuously by the pressure of the liquid so received and to continuously by-pass a portion of the liquid out of said single exhaust port, and a pressure maintaining means where the fluid passes from said system.

4. A liquid distributing system comprising a pump having a liquid reservoir, a pipe-line connected to the pump and returning to the pump reservoir and provided with adjustable means for controlling the volume of liquid flowing therethrough under pressure, a plurality of liquid dispensing feeders connected to said pipe line, each of said feeders having a single inlet adapted to receive liquid under pressure from said pump through said pipe-line and each of said feeders having a single exhaust port for exhausting liquid by-passing through the feeder, and each of said feeders having at least one reciprocatable dispensing valve adapted to dispense a quantity of fluid upon each stroke thereof and also having a reciprocatable control valve for controlling liquid under pressure alternately to opposite sides of the associated reciprocatable dispensing valve or valves, the reciprocatable control valve of each feeder being adapted to be continuously reciprocated by the pressure of the liquid entering its associated feeder through said feeder inlet and to continuously by-pass a portion of the liquid out of said single exhaust to a continuation of the pipe-line, one of said feeders having a visible member movable with the action of the reciprocatable control valve, means for varying the quantity of fluid dispensed from a dispensing valve, means for indicating the action of said dispensing valve, a yielding resistance means for controlling the flow of the fluid at the end of said conduit, and enclosed visual means for observing the return flow of fluid from the pipe line to the pump reservoir.

5. In combination, a pump, a conduit leading therefrom and returning thereto, and a plurality of liquid discharging feeder connected to said conduit intermediate its ends, each of said feeders having means for selectively discharging a measured quantity of liquid to a plurality of receptacles, each of said means being actuated by liquid under pressure passing through the conduit in a continuous direction of flow.

6. A single-line uniflow recirculating liquid dispensing system comprising, a pump, a conduit leading from said pump and returning thereto for circulating and recirculating liquid in one predetermined direction, a plurality of liquid discharging feeders connected to said conduit intermediate the ends thereof, each of said feeders having at least two outlet ports and a liquid dispensing valve associated therewith for dispensing liquid alternately from said ports so long as liquid circulates through said conduit.

DAVID R. HILLIS.